(12) United States Patent
Putcha et al.

(10) Patent No.: US 10,618,447 B2
(45) Date of Patent: Apr. 14, 2020

(54) DELIVERY VEHICLE AND SYSTEMS OR PARTS THEREOF

(71) Applicant: Walmart Apollo, LLC, Bentonville, AR (US)

(72) Inventors: Sai Phaneendra Sri Harsha Viswanath Putcha, Bentonville, AR (US); Luke M. Reynolds, Overland Park, KS (US); Christian James Munoz, Centerton, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 15/785,053

(22) Filed: Oct. 16, 2017

(65) Prior Publication Data
US 2018/0105092 A1    Apr. 19, 2018

Related U.S. Application Data

(60) Provisional application No. 62/409,035, filed on Oct. 17, 2016, provisional application No. 62/409,057, (Continued)

(51) Int. Cl.
*B65G 1/04* (2006.01)
*B60P 3/20* (2006.01)
(Continued)

(52) U.S. Cl.
CPC ............... *B60P 3/205* (2013.01); *B60P 1/36* (2013.01); *B60P 3/007* (2013.01); *B60P 3/20* (2013.01); *B60P 7/0892* (2013.01)

(58) Field of Classification Search
CPC ................................. B65G 1/045; B65G 1/12
(Continued)

(56) References Cited

U.S. PATENT DOCUMENTS 1,382,837 A * 6/1921 Jurek .................... F25D 23/025
                                                           109/68
2,835,210 A   5/1958 Boyd
(Continued)

FOREIGN PATENT DOCUMENTS

CN        203780628        8/2014
EP          2581264        4/2013
(Continued)

OTHER PUBLICATIONS

"Fold-Away Foldable Van Shelving"; http://rangerdesign.com/products/foldawayshelving/; May 2, 2016; pp. 1-5.
(Continued)

*Primary Examiner* — Gregory W Adams
*Assistant Examiner* — Willie Berry, Jr.
(74) *Attorney, Agent, or Firm* — Fitch, Even, Tabin & Flannery LLP

(57) ABSTRACT

In some embodiments, apparatuses and methods are provided herein useful to improve delivery vehicles with storage compartments for items and product containers. In some embodiments, the storage compartments have a plurality of horizontally-mounted support rails mounted on opposite sides of the storage compartment to receive the product containers and retractable retaining elements disposed adjacent ends of the support rails proximate storage compartment openings to help retain the product containers. In another configuration, the horizontally-mounted support rails are movable, such that the product containers supported by the support rails permit are movable. By one approach, the delivery vehicle includes a conveyor mechanism to move the horizontally-mounted support rails. In yet another embodiment, the delivery vehicle may include a temperature-controlled compartment for receiving product containers, a door providing access to the temperature-controlled
(Continued)

compartment, and an insulating panel configured to retain air, such as chilled air, in the temperature-controlled compartment.

35 Claims, 14 Drawing Sheets

Related U.S. Application Data filed on Oct. 17, 2016, provisional application No. 62/409,045, filed on Oct. 17, 2016.

(51) Int. Cl.
*B60P 7/08* (2006.01)
*B60P 1/36* (2006.01)
*B60P 3/00* (2006.01)

(58) Field of Classification Search
USPC .................................................. 414/331.04
See application file for complete search history.

(56) References Cited

U.S. PATENT DOCUMENTS

| | | |
|---|---|---|
| 4,258,631 A | 3/1981 | Brown |
| 4,288,992 A | 9/1981 | Eliason |
| 5,909,798 A | 6/1999 | Shaver |
| 6,354,778 B1 | 3/2002 | Coslovi |
| 6,474,446 B1 | 11/2002 | Greenlaw |
| 7,494,309 B2 | 2/2009 | Khattab |
| 7,641,253 B2 | 1/2010 | Steiger |
| 2002/0046749 A1* | 4/2002 | Leutner ................ F24C 15/007 126/190 |
| 2007/0289124 A1* | 12/2007 | Oh ......................... B24B 37/30 29/729 |
| 2012/0186192 A1* | 7/2012 | Toebes .................... B65G 1/04 53/235 |
| 2013/0270988 A1* | 10/2013 | Nicholson ............. A47B 81/00 312/400 |

FOREIGN PATENT DOCUMENTS

| | | |
|---|---|---|
| EP | 2772155 | 9/2014 |
| GB | 2348797 | 10/2000 |
| WO | 2016124672 | 8/2016 |

OTHER PUBLICATIONS

PCT; App. No. PCT/US2017/056962; International Search Report and Written Opinion dated Jan. 4, 2018.

* cited by examiner

US 10,618,447 B2

DELIVERY VEHICLE AND SYSTEMS OR PARTS THEREOF

CROSS-REFERENCE TO RELATED APPLICATION

This application claims the benefit of U.S. Provisional Application No. 62/409,035 filed Oct. 17, 2016, U.S. Provisional Application No. 62/409,057, filed Oct. 17, 2016, and U.S. Provisional Application No. 62/409,045, filed Oct. 17, 2016, which are incorporated herein by reference in their entirety.

TECHNICAL FIELD

This invention relates generally to delivery vehicles and systems or parts thereof.

BACKGROUND

Delivery vehicles of various kinds are known in the art. Examples include a variety of automobiles, so-called minivans, full-size vans, a variety of trucks such as panel trucks, and trailers, to note but a few examples in these regards. As used herein, a "delivery vehicle" will be understood to carry at least one delivery person regardless of whether the vehicle itself is driven by a human or is partially or wholly autonomously navigated and driven.

In many cases a given delivery vehicle carries a plurality of items that are to be delivered to a corresponding plurality of target recipients at different delivery addresses. Accordingly, the on-board delivery person is typically responsible for delivering all of the conveyed items to all of the intended target recipients during a single delivery run. Given that recipients typically want their deliveries as soon as possible, the delivery person is typically quite busy loading, unloading, and/or rearranging the contents of the truck to get the recipients their packages in a reasonable amount of time. In addition to requesting quick delivery, recipients typically want the integrity of the items maintained during shipment of their items.

BRIEF DESCRIPTION OF THE DRAWINGS

Disclosed herein are embodiments of systems, apparatuses and methods pertaining to delivery trucks and systems or parts thereof. This description includes drawings, wherein.

Figure 1:
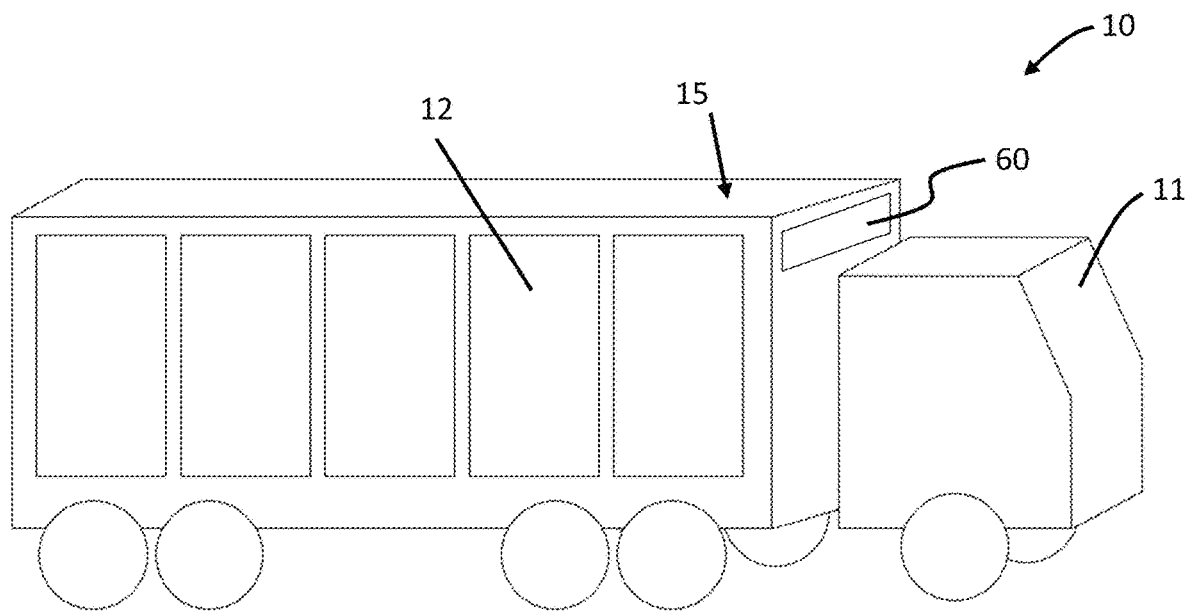
FIG. 1 is a schematic perspective view in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein useful to improve delivery vehicles with storage compartments. For example, the storage compartments typically include a plurality of horizontally-mounted first and second support rails mounted on opposite sides of the storage compartment to receive product containers and, in one illustrative embodiment, have retractable retaining elements disposed adjacent ends of the first and second support rails proximate storage compartment openings. The retractable retaining elements are generally movable between a first position and a second position. In the first position the retractable retaining elements securely retain the product containers within the storage compartments during transit, and in the second position, the retractable retaining elements are moved out of the way to permit quick loading of the storage compartments.

In one illustrative example, the retractable retaining elements include a system of hydraulic knobs, which may be individually retractable or systemically retractable. The system of hydraulic knobs may further include an engagement switch configured to move the hydraulic knobs and position the hydraulic knobs in the first position configured to securely retain each of the product containers within an associated slot in the storage compartments. In this manner, a delivery person may retract a plurality of hydraulic knob retaining elements at one time or may selectively retract one of the plurality of hydraulic knob retaining elements at a given compartment interface.

In another illustrative example, the retractable retaining elements comprise spring-loaded knobs. By one approach, the retractable retaining elements are disposed on an inner shaft onto which the spring-loaded knobs are mounted. The system may further include an outer sleeve with openings therein through which the spring-loaded knobs extend when the spring-loaded knobs are disposed in the first position to thereby retain the product containers and items therein in position in the storage compartments. In one configuration, the inner shaft and outer sleeve are slidable relative to one another such that the spring-loaded knobs are moved to the second position when the outer sleeve is disposed over the spring-loaded knobs and the spring-loaded knobs are moved to the first portion when the outer sleeve is moved such that the spring-loaded knobs extend through the openings in the first position.

In one configuration, the first and second support rails are mounted on the inside walls of the storage compartments and/or a vertical mounting bracket. The first and second support rails are generally horizontally-mounted and permit multiple product containers to be stored atop one another with each of the product containers having the first support rail disposed along a first side thereof and the second support rail disposed along a second, opposite side thereof. In one illustrative approach, the storage compartment includes five first support rails and five second support rails such that five product containers are stored in the storage compartment.

In yet another configuration, the support rails are movable, such that the plurality of first and second support rails are vertically movable such that the product containers supported thereby are movable as well. In one example, the delivery vehicle further includes a conveyor mechanism such as first and second conveyor chains disposed on opposite sides of the storage compartments. By one approach, the first and second conveyor chains are configured to move the horizontally-mounted first and second support rails that are securely attached to the first and second conveyor chains such that the first and second support rails are configured to be moved vertically by pulling, rotating, or otherwise advancing on the first and second conveyor chains thereby moving the product containers supported thereon.

In some configurations, the delivery vehicle includes one or more temperature-controlled compartments for receiving product containers and a door providing access to the temperature-controlled compartment. Further, the delivery vehicle may include a movable curtain disposed at a temperature-controlled compartment opening, the movable curtain configured to retain air in the temperature-controlled compartment. In this manner, the delivery vehicle is better able to maintain the proper temperature of the temperature-controlled compartment.

In one illustrative embodiment, the delivery vehicle has a rod or curtain roller disposed at a top of the temperature-controlled compartment opening and an electric switch wherein the roller curtain or movable curtain is configured to be wound, at least partially, around the rod at the top of the opening when the electric switch is engaged thereby exposing a portion of the temperature-controlled compartment opening to permit access thereto. In another illustrative embodiment, the delivery vehicle includes a rod disposed at a top of the compartment opening, a movable curtain wound at least partially therearound, a pulley, and a chain configured to be pulled to thereby wind the movable curtain around the rod thereby exposing a portion of the temperature-controlled compartment opening to permit access thereto.

In yet another embodiment, the delivery vehicle may include an insulating door panel at the opening of the temperature-controlled compartment, the insulating door panel being disposed adjacent an inside wall of the door. By one approach, the insulating door panel is segmented such that segments of the insulating door panel are movable to permit access to the temperature-controlled compartment without moving the remainder of the insulating door panel from the temperature-controlled compartment opening. Further, the insulating door panel may include a movable panel portion and a non-movable panel portion. The delivery vehicle may further include a conveyor mechanism such as first and second conveyor chains disposed on opposite sides of the storage compartments, to move the horizontally-mounted first and second support rails securely attached to the conveyor mechanism and the product containers supported thereon. In this manner, an uppermost product container may be moved to a lowermost position. In addition, the movable portion of the insulating door panel may be disposed adjacent the lowermost position of the product containers and the non-movable panel portion is disposed adjacent remaining positions of the product containers such that the movable portion of the insulating door panel permits the product containers to be loaded into and out of the temperature-controlled compartment and the first and second conveyor chains permit the horizontally-mounted first and second support rails and the product containers supported thereby to be moved between positions in the temperature-controlled compartment.

Generally speaking, pursuant to various embodiments, systems, apparatuses and methods are provided herein useful to improve delivery vehicles with storage compartments having a plurality of horizontally-mounted first and second support rails mounted on opposite sides of the storage compartment that are configured to support and receive a portion of the product containers thereon. In this manner, the plurality of horizontally-mounted support rails permit multiple product containers to be stored atop one another with each of the product containers having the first support rail disposed along a first side thereof and the second support rail disposed along a second, opposite side thereof, and first and second conveyor chains disposed on opposite sides of the storage compartments, the first and second conveyor chains configured to move the horizontally-mounted support rails that are securely attached to the first and second conveyor chains such that the first and second support rails are configured to be moved vertically by pulling on the first and second conveyor chains thereby moving the product containers supported thereon.

Pursuant to various additional embodiments, systems, apparatuses and methods are provided herein useful to improve delivery vehicles with storage compartments having a plurality of horizontally-mounted first and second support rails mounted on opposite sides of the storage, a temperature-controlled compartment configured to receive a plurality of product containers within the temperature-controlled compartment, and a movable curtain disposed at a temperature-controlled compartment opening that is configured to retain air in the temperature-controlled compartment opening. By one approach, the movable curtain is a roller curtain having a rod disposed at a top of the temperature-controlled compartment opening and the movable curtain is configured to be wound around the rod to expose a portion of the temperature-controlled compartment thereby permitting access to the temperature-controlled compartment or at least a portion thereof.

Pursuant to various additional embodiments, systems, apparatuses and methods are provided herein useful to improve delivery vehicles with a temperature-controlled compartment configured to receive a plurality of product containers. As used herein, the temperature-controlled storage compartments typically have a plurality of horizontally-mounted first and second support rails that are mounted on opposite sides thereof (which are configured to support and receive a portion of the product containers thereon), a door providing access to the temperature-controlled compartment, and an insulating door panel disposed at an opening of the temperature-controlled compartment (where the insulating door panel helps retain the air and temperature in the temperature-controlled compartment). By one approach, the insulating door panel is segmented such that portions of the insulating door panel are openable without moving remaining portions of the insulating door panel. As suggested above, the segmented insulating panel may include a movable portion and a non-movable portion. Further, the delivery vehicle may include first and second conveyor chains configured to move the horizontally-mounted first and second support rails securely attached to the first and second conveyor chains and the product containers supported thereon such that an uppermost product container may be moved to a lowermost position, where the movable portion of the insulating door panel may be disposed adjacent. In this manner, only the lowermost position of the product containers is adjacent the movable panel and the non-movable panel portion is disposed adjacent remaining positions of the product containers. While the movable portion of the insulating door panel permits the product containers to be loaded into and out of the temperature-controlled compartment, the first and second conveyor chains permit the horizontally-mounted first and second support rails and the product containers supported thereby to be moved between positions in the temperature-controlled compartment and adjacent the access point of the compartment where the movable panel is located.

Referring now to FIG. 1, a delivery vehicle 10 is illustrated as having a number of storage compartments 12 that may be filled with items, containers, or packages to be delivered to a plurality of target recipients at different delivery addresses. By one approach, the storage compartments 12 are accessible through doors 32 that can be manually opened and closed by the delivery person. In the example of FIG. 1, the delivery vehicle 10 is a truck with a cab 11 that can be driven by a delivery person. To that end, the delivery vehicle 10 typically has a passenger compartment, an engine or motor, wheels, including those configured to be driven by the engine or motor, and a cargo-carrying area 15. The delivery vehicle 10 can include any suitable vehicle control and propulsion mechanism, as well known and understood in the art, and, as such, require no further description.

Figure 2:
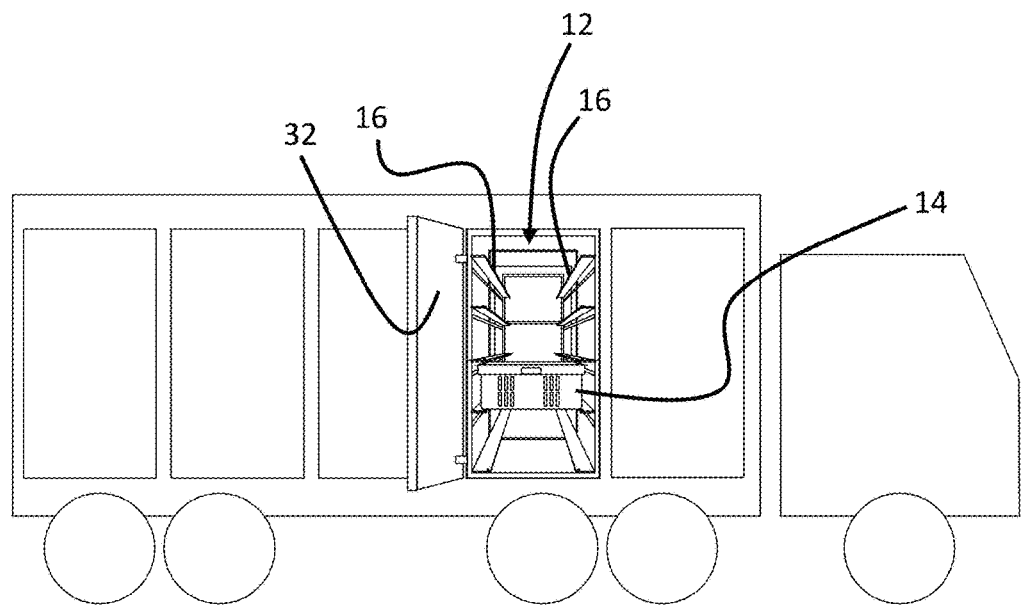
FIG. 2 is a schematic side view in accordance with several embodiments.

As illustrated in FIGS. 1 and 2, the cargo-carrying area 15 of the delivery vehicle 10 includes a number of storage compartments 12, which may be accessible by the delivery person from the side of the vehicle 10 and/or the rear of the vehicle. These storage compartments 12 may receive product containers 14 and/or the aforementioned items needing delivery to recipients. To organize the storage compartments 12, the delivery vehicle 10 may include a frame or other support structure, such as support rails 16, discussed below.

While some of the storage compartments 12 may have ambient conditions therein, proper for storage of a number of different goods that do not require specialized conditions, other storage compartments, such as temperature-controlled storage compartments 13, may be included in the delivery vehicle 10 to provide a suitable storage environment for certain products, such as those requiring cool or freezing temperatures to maintain the integrity of the product or item over a given period of time.

By one approach, the product containers 14 are configured to contain one or more products, one or more bags containing at least one product, a plastic tub, box or other receptacle containing at least one product or bags with products therein, and so forth. After products or items are loaded into the product containers 14, the delivery person (or another individual) generally loads the product containers 14 into position in the storage compartments 12 or temperature-controlled storage compartment 13.

Figure 3:
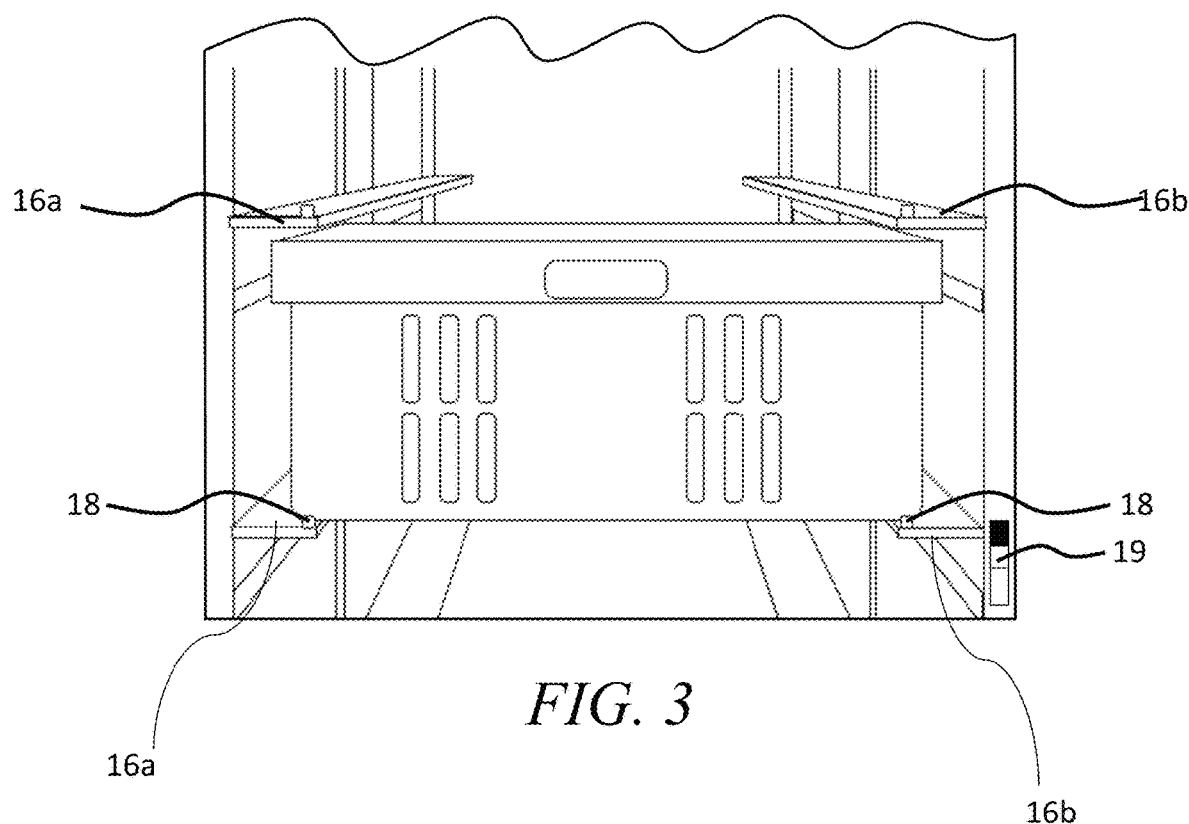
FIG. 3 is side view of a portion of a storage compartment in accordance with some embodiments.

In one exemplary approach, the storage compartments 12 that are designed to receive a plurality of product containers 14 have a plurality of horizontally-mounted first and second support rails 16 therein designed to receive and/or support multiple product containers 14. As illustrated in FIG. 3, the first support rails 16a are mounted on one side of the storage compartment 12 and the second support rails 16b are mounted on the opposite side of the storage compartment 12. Together, the support rails 16a, 16b receive a portion of the product containers 14 and support the product containers 14 in their position or slot of the storage compartment 12. Further, sets of the first and second support rails 16a, 16b are mounted at different heights along the height of the storage compartment such that the product containers 14 may be stacked atop one another at different heights. In one illustrative example, a first set of first and second support rails 16a, 16b are mounted at one height and a second set of first and second support rails 16a, 16b are mounted at a second height. By one approach, the support rails 16a, 16b are mounted on inside walls of the storage compartment 12. In yet another example, the first and second support rails 16a, 16b are mounted onto one or more vertical mounting brackets inside the storage compartment 12.

In one illustrative approach, the first and second support rails 16 or another structure associated therewith includes retractable retaining elements 18 disposed adjacent ends of the first and second support rails 16. For example, the retractable retaining elements 18 may be disposed proximate the storage compartment opening. In one illustrative approach, the retractable retaining elements have a first position in which the product containers are securely retained within the storage compartments such that when the delivery vehicle 10 is in operation or transit, the product containers 14 do not move or shift greatly during transit and a second position in which the product containers 14 may be quickly or easily loaded into or unloaded from the storage compartment 12. By retaining the product containers 14 in the proper position in the storage compartment 12, the retractable retaining elements 18 operate in conjunction with the support rails 16 to keep the product containers 14 in position within the storage compartments 12 during transit.

By one approach, the storage compartment 12 is divided into a number of positions or slots by the first and second support rails 16 such that a plurality of product containers 14 may be loaded into the storage compartment 12 and removed therefrom. In one illustrative approach, the storage compartment 12 includes five slots, each of which may receive a product container 14. By one approach, the configuration of the delivery vehicle 10 permits the product container(s) 14 within the storage compartment(s) 12 to be independently loaded and unloaded from therefrom. In another configuration, discussed below, the storage compartment 12 is unloaded in a certain manner or a specific order, such as to help retain the proper temperature of a compartment.

The first and second support rails 16 may have a variety of configurations or appearances. For example, the support rail 16 of FIG. 3 has a flat configuration that extends like a ledge from the wall into the interior of the storage compartment 12. Other configurations may include a flange, lip, hook element, slot, or other structure. Further, the additional structure of the first and second support rails 16 may engage with structure on the product containers 14. In addition, while the example figure shows the first and second support rails 16 continuously disposed along the length of the storage compartment 12, other configurations may have discontinuous portions or openings in the body of the first and second support rails 16.

By one approach, the delivery vehicle 10 includes a system of hydraulic knobs that may be employed to move the retractable retaining elements or knobs from their first secure position to the second loading position. As used herein, the hydraulic knobs or retractable retaining elements may be individually retractable or systematically retractable. In one illustrative example, the system of hydraulic knobs includes an engagement switch 19 (FIG. 3) that moves the position of the hydraulic knobs from the first secure position that securely retains the product containers to/from the second (loading/unloading) position.

Figure 4:
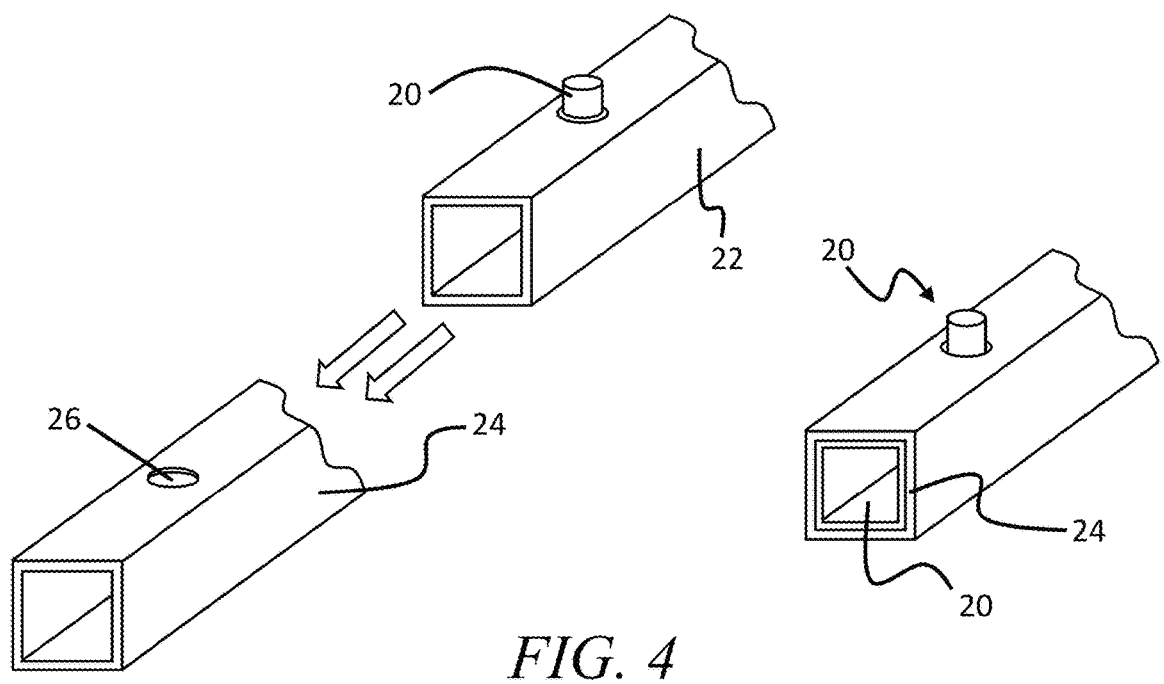
FIG. 4 is partial perspective view of a retaining element in accordance with several embodiments.

By another approach, the retractable retaining elements 18 are spring-loaded knobs 20 (FIG. 4). By having the retractable retaining elements 18 spring-loaded, the spring-loaded knobs 20 may be easily compressed so that the product containers 14 may be more easily loaded into and removed from the storage compartments 12. As illustrated in FIG. 4, the spring-loaded knob 20 may be disposed on an inner shaft 22. As shown, the inner shaft 22 fits within an outer sleeve or shaft 24 defining an opening 26 through which the spring-loaded knob 20 will extend in the first, secure position. Within the storage compartment 12, the inner shaft 22 and the outer sleeve 24 are slidable relative to one another such that the spring-loaded knobs 20 are disposed in the second position when the outer sleeve is disposed over the spring-loaded knobs and the spring-loaded knobs 20 are move to the first position when the outer sleeve 24 is moved such that the spring-loaded knobs 20 extends through the openings in the outer sleeve 24. More particularly, when the inner shaft 22 is moved relative to the outer sleeve 24, the material of the outer sleeve 24 will depress the spring loaded knobs 20 such that they are moved into the second position permitting quick and easy loading and unloading of the product containers 14 from the storage compartments 12. Further, once the product container(s) 14 are loaded into the storage compartment(s) 12, the inner shaft 22 is moved back relative to the outer sleeve 24 such that the spring-loaded knob 20 extends through the opening 26 such that it is in the first position securely retaining the product containers 14 during transport. While the spring-loaded knobs 20 and openings 26 are illustrated in FIG. 4 as disposed on concentrically or coaxially disposed shafts, the spring-loaded knobs 20 also may be disposed on a first plate that is moved relative to a second plate with openings 26.

Figure 5:
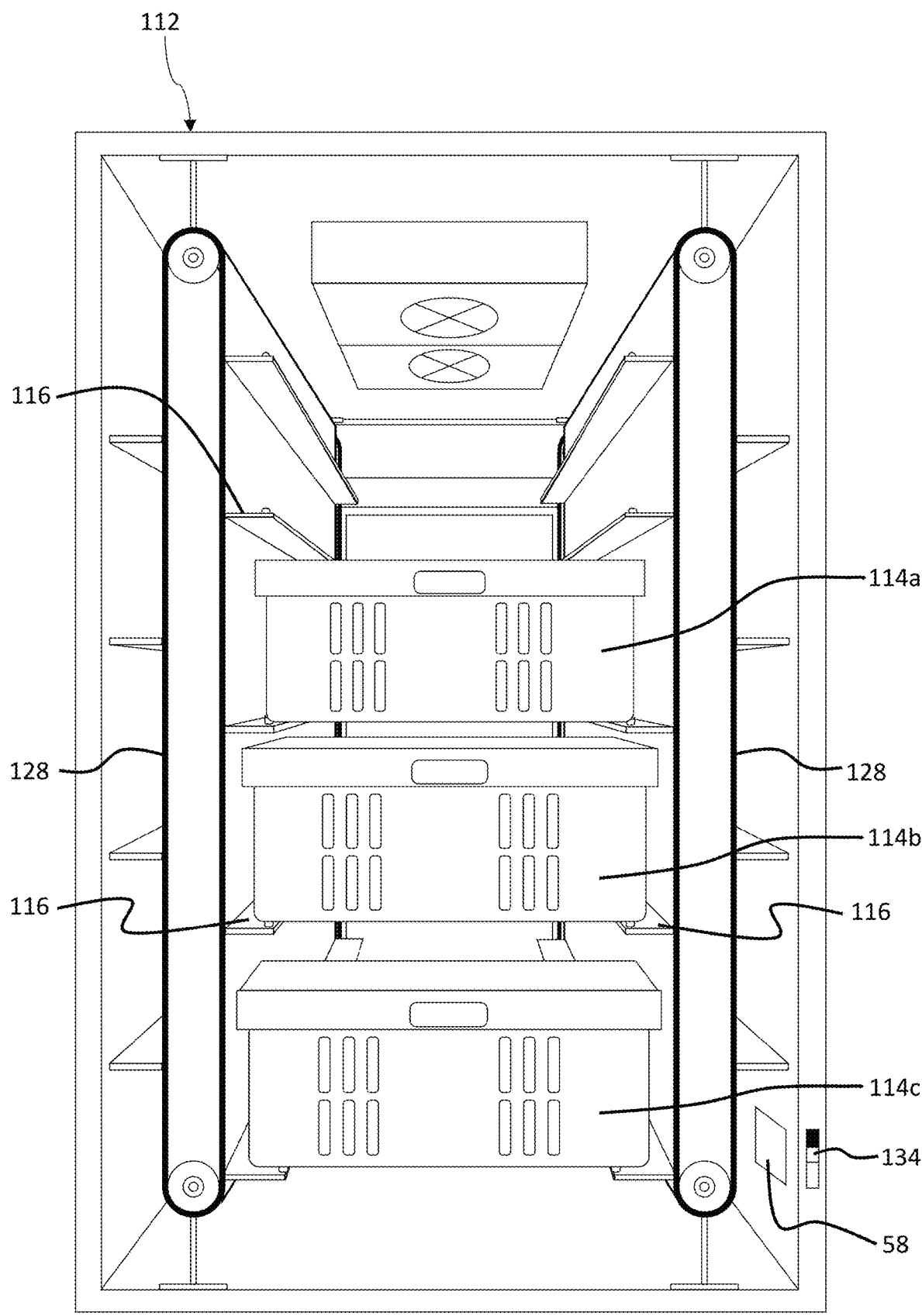
FIGS. 5-7 are side views of a storage compartment (with the access door removed therefrom) in accordance with some embodiments.
Figure 6:
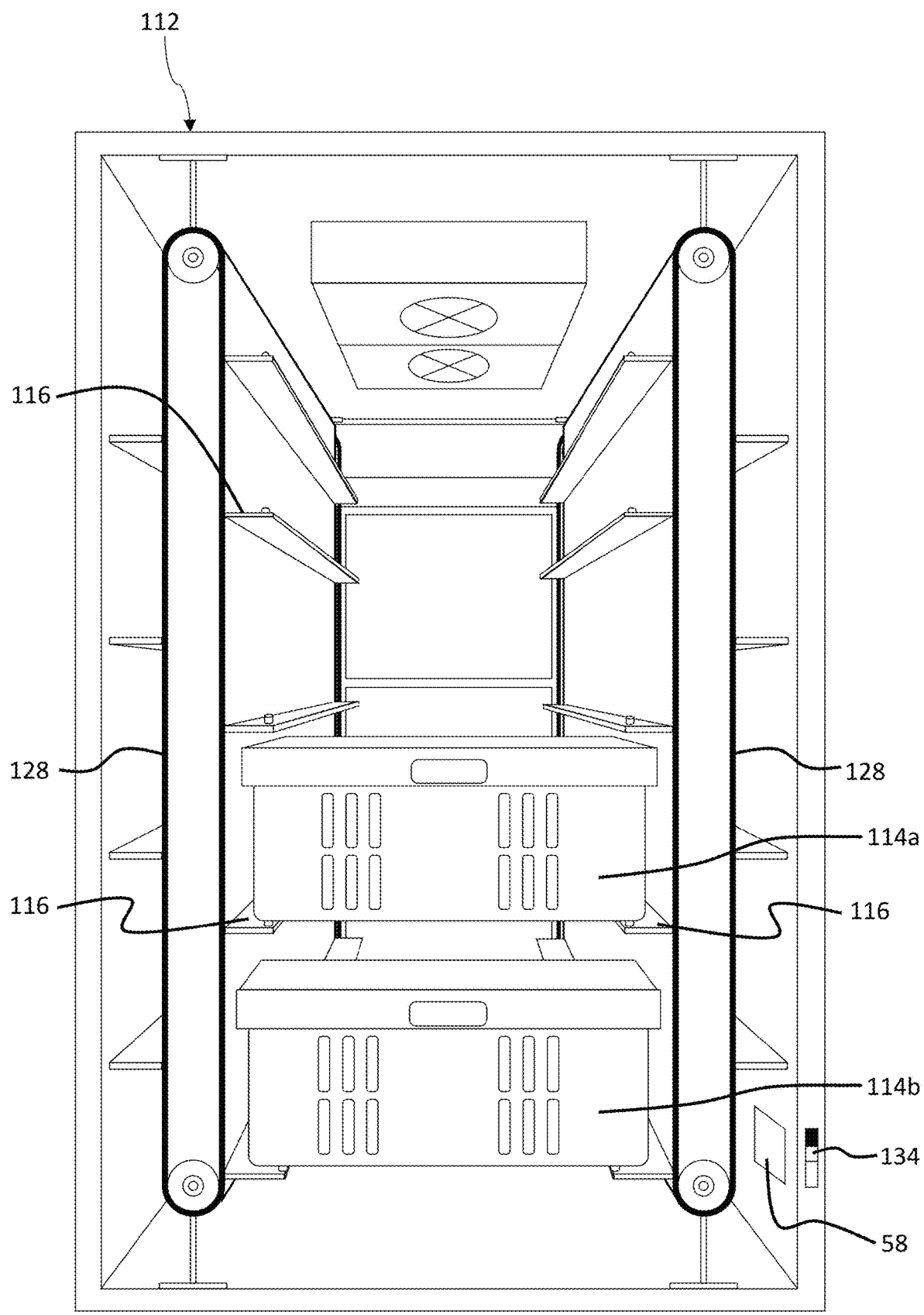
Figure 7:
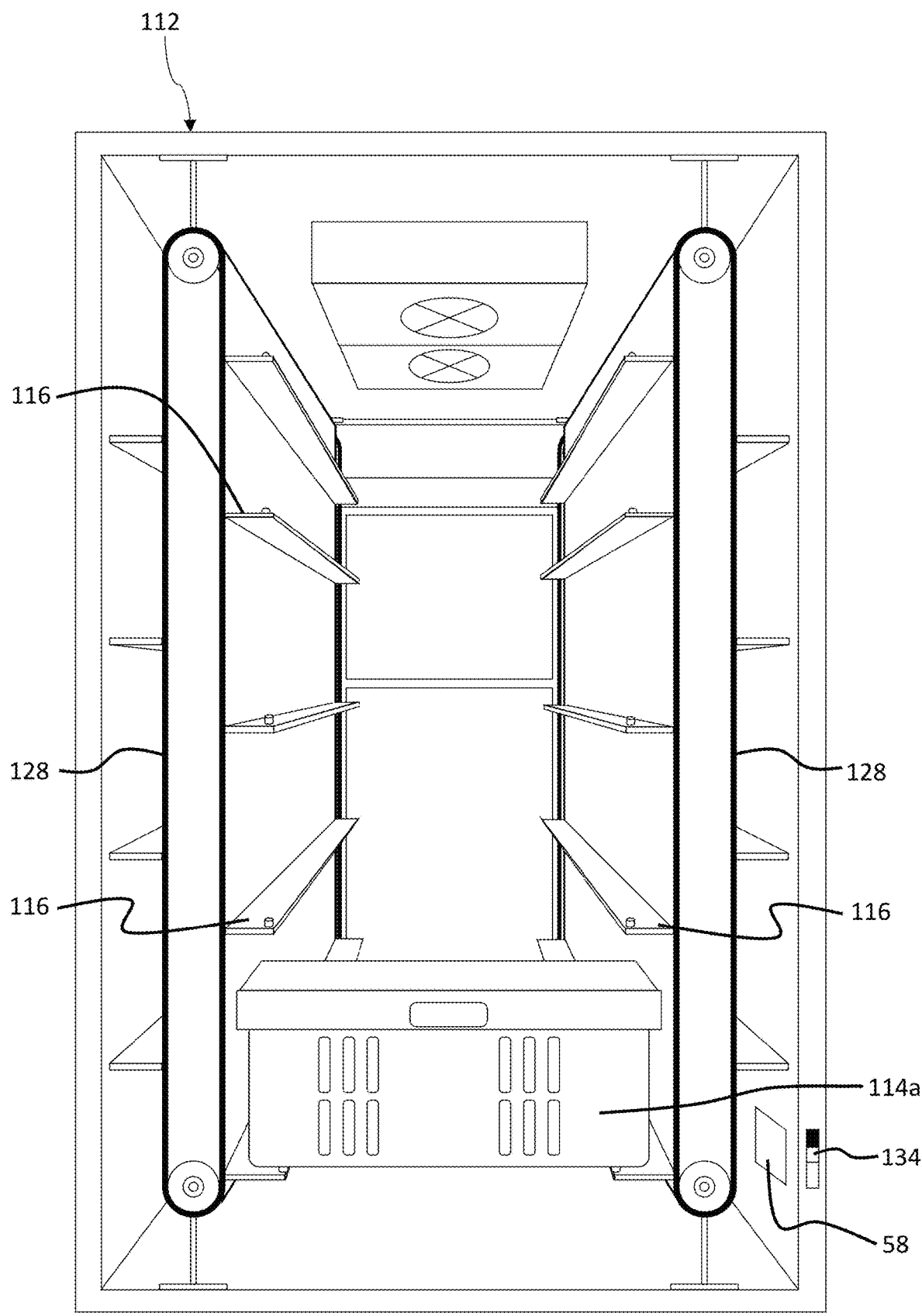

By another approach, the first and second support rails 16 are movable, such as via a conveyor mechanism. As noted above, a plurality of first and second support rails 16 may be horizontally mounted inside the storage compartments 12 to permit accommodation of multiple product containers 14 stored atop one another. As shown in FIG. 5, in one configuration, a set of first and second support rails 116 are attached to a conveyor mechanism, such as the first and second conveyor chains 128, disposed on opposite sides of the storage compartment 112. In one illustrative approach, the first and second conveyor chains 128 are configured to vertically move the first and second support rails 116 that are securely attached thereto such as by pulling, rotating, or otherwise activating the first and second conveyor chains 128 to thereby move the product containers supported by the first and second support rails 116.

In operation, the first and second conveyor chains 128 typically include one or more devices keeping the conveyor chains 128 in sync with one another such that moving one of the conveyor chains results in a corresponding movement of the other of the conveyor chains. In this manner, the product containers 14 supported by support rails 116 on different conveyor chains remain generally level or within a certain level range. Further, the delivery vehicle 10 may include a switch 134 and a control circuit 58 to move the first and second delivery chains 128.

As used herein, the conveyor mechanism, such as first and second conveyor chains 128, is employed to move, convey, or otherwise dispose the product containers 14 in a location for easy removal of the product container(s) 14 by the delivery person. As noted, the delivery vehicle 10 may include a switch 134 and a control circuit 58 to control the conveyor mechanism, such as the first and second conveyor chains 128. Further, the control circuit 58 may be operably coupled to the switch by a wireless or wired connection. The term control circuit refers broadly to any microcontroller, computer, or processor-based device with processor, memory, and programmable input/output peripherals, which is generally designed to govern operation of other components and devices. It is further understood to include common accompanying accessory devices, including memory, transceivers for communications with other components and devices, etc. These architectural options are well known and understood in the art and require no further description here. The control circuit 58 may be configured (for example, by using corresponding programming stored in a memory as will be understood by those skilled in the art) to carry out one or more of the steps, actions, and/or functions described herein. The control circuit 58 also can be configured to control operations of the cooling systems 60 to control the temperature or temperatures of the temperature-controlled compartment(s) 13.

As noted above, in one illustrative configuration, the delivery vehicle 10 includes one or more temperature-controlled compartments 13 closed by a door, such as insulating door 33, which can provide access to the temperature-controlled storage compartment 13. The temperature-controlled compartments 13 are configured to store and transport a variety of items for subsequent delivery and receive product containers 14 similar to those previously described. For example, the temperature-controlled compartments 13 typically include sets of first and second support rails 16 to support a number of product containers 14 thereon. Furthermore, the first and second support rails 16 also may include the retractable retaining elements 18 described above and/or may be mounted onto first and second conveyor chains 128 described herein.

The temperature-controlled storage compartment 13, in one form, may be divided into separate temperature-controlled zones, which can include a freezer compartment, a refrigerated compartment, and a room-temperature compartment. If desired, the temperature-controlled storage compartment 13 can further include or replace one of the other compartments with a non-temperature controlled compartment. By one approach, the temperature-controlled storage compartment 13 may include a top freezer compartment, a middle, refrigerated compartment, and a room-temperature compartment therebelow. By yet another approach, the temperature-controlled storage compartment 13 includes a bottom freezer compartment, a middle, refrigerated compartment, and a room-temperature compartment thereabove.

The delivery vehicle 10 can include one or more cooling systems, such as cooling system 60, to control the temperature within the temperature-controlled zones, which can have any suitable configuration as known in the art. More specifically, each zone can have a dedicated cooling system, a single cooping system can control the temperature of multiple compartments, or the like. Alternatively, or in addition thereto, the zones can utilize passive cooling items, such as disposed ice or an equivalent thereof in the zones.

Figure 8:
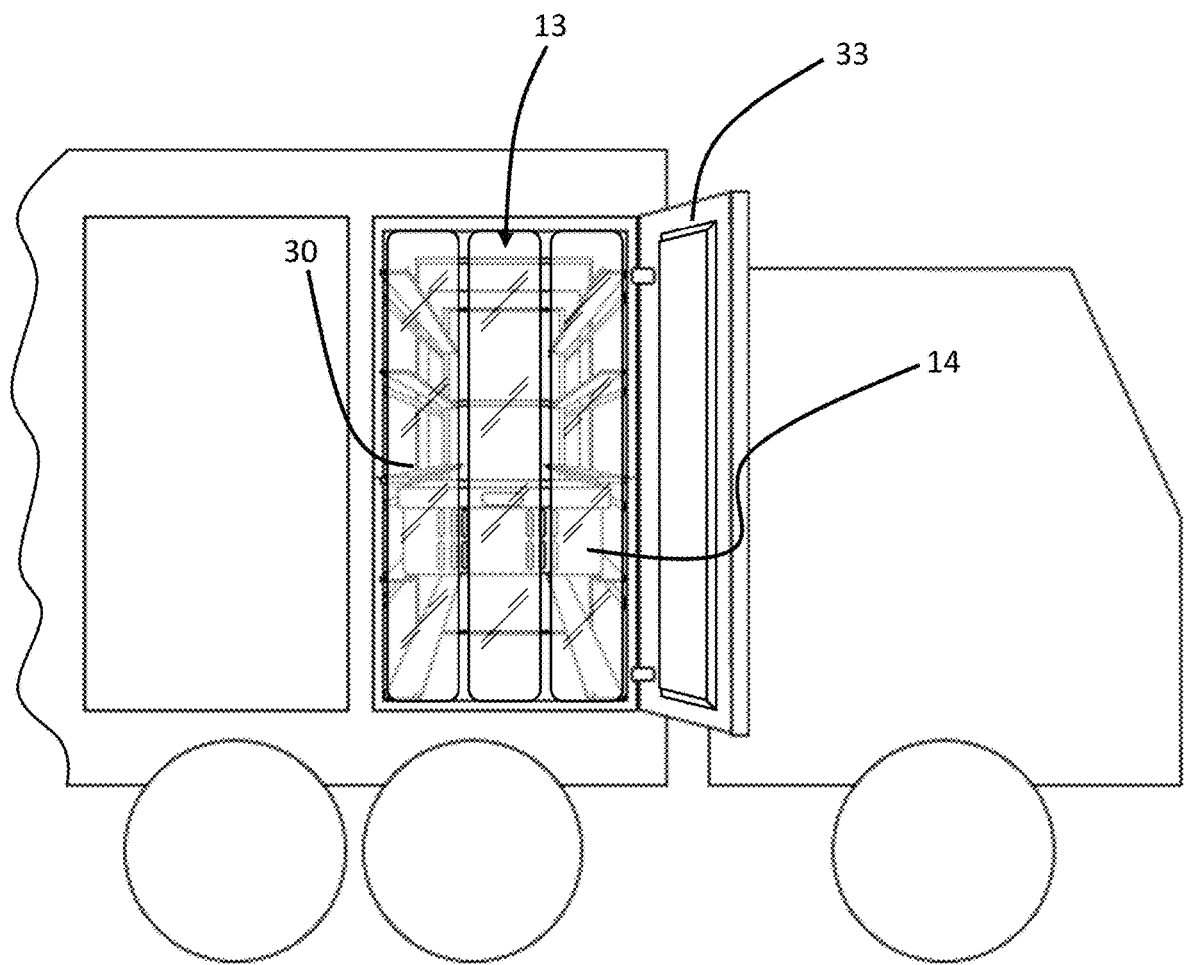
FIG. 8 is side views of a temperature-controlled storage compartment in accordance with some embodiments.

To help retain the proper temperature of the temperature-controlled storage compartment 13, the delivery vehicle 10 may include a movable curtain 30 disposed at an opening of the temperature-controlled storage compartment 13, where the movable curtain 30 is configured to retain air within the temperature-controlled storage compartment 13. By one approach, the movable curtain 30 may have different sections that are movable with respect to the other sections thereof. For example, as shown in FIG. 8, the movable curtain 30 may include three vertical sections that are each movable independent of the other section.

Figure 9:
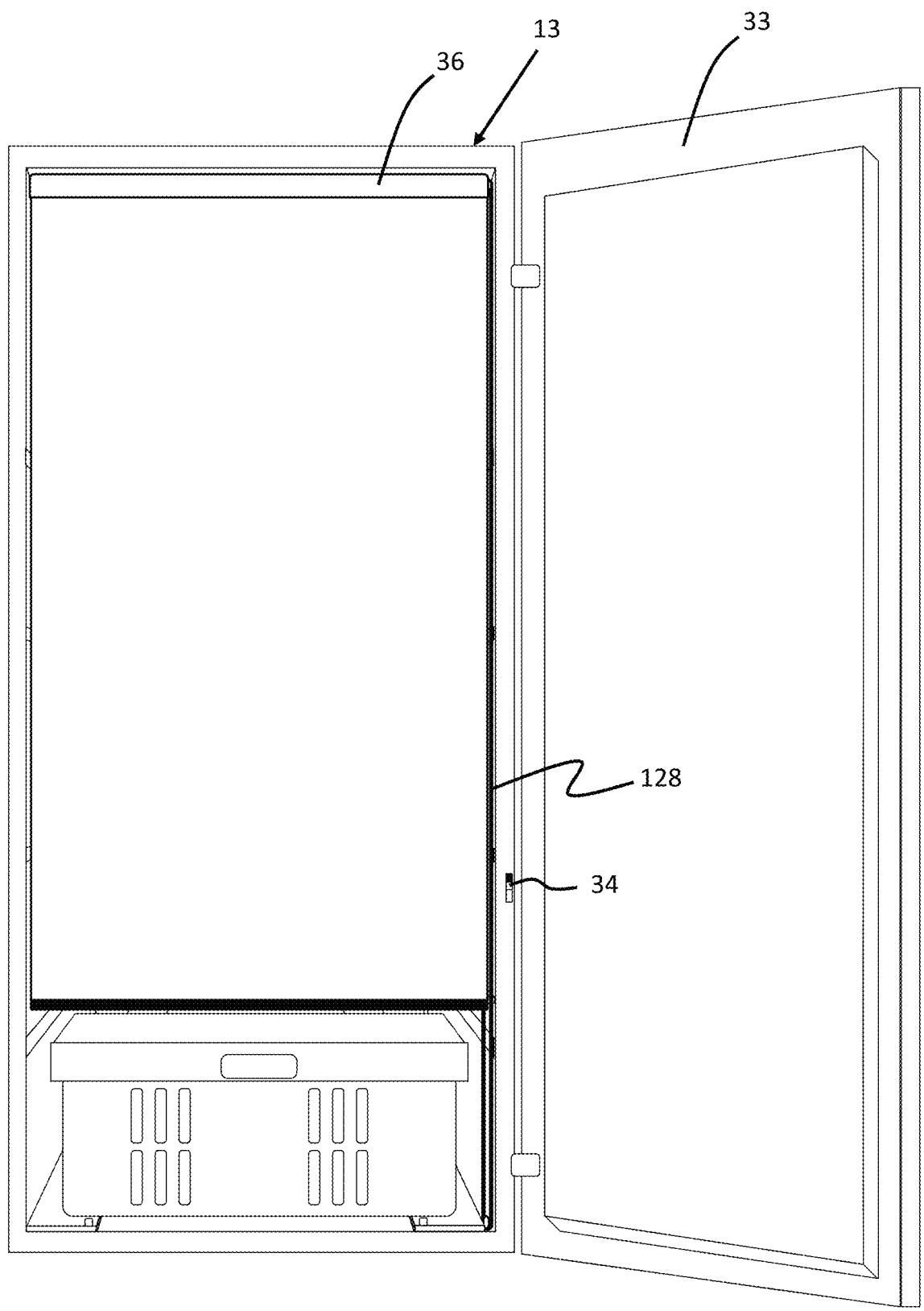
FIGS. 9-11 are side views of another temperature-controlled storage compartment in accordance with some embodiments.
Figure 10:
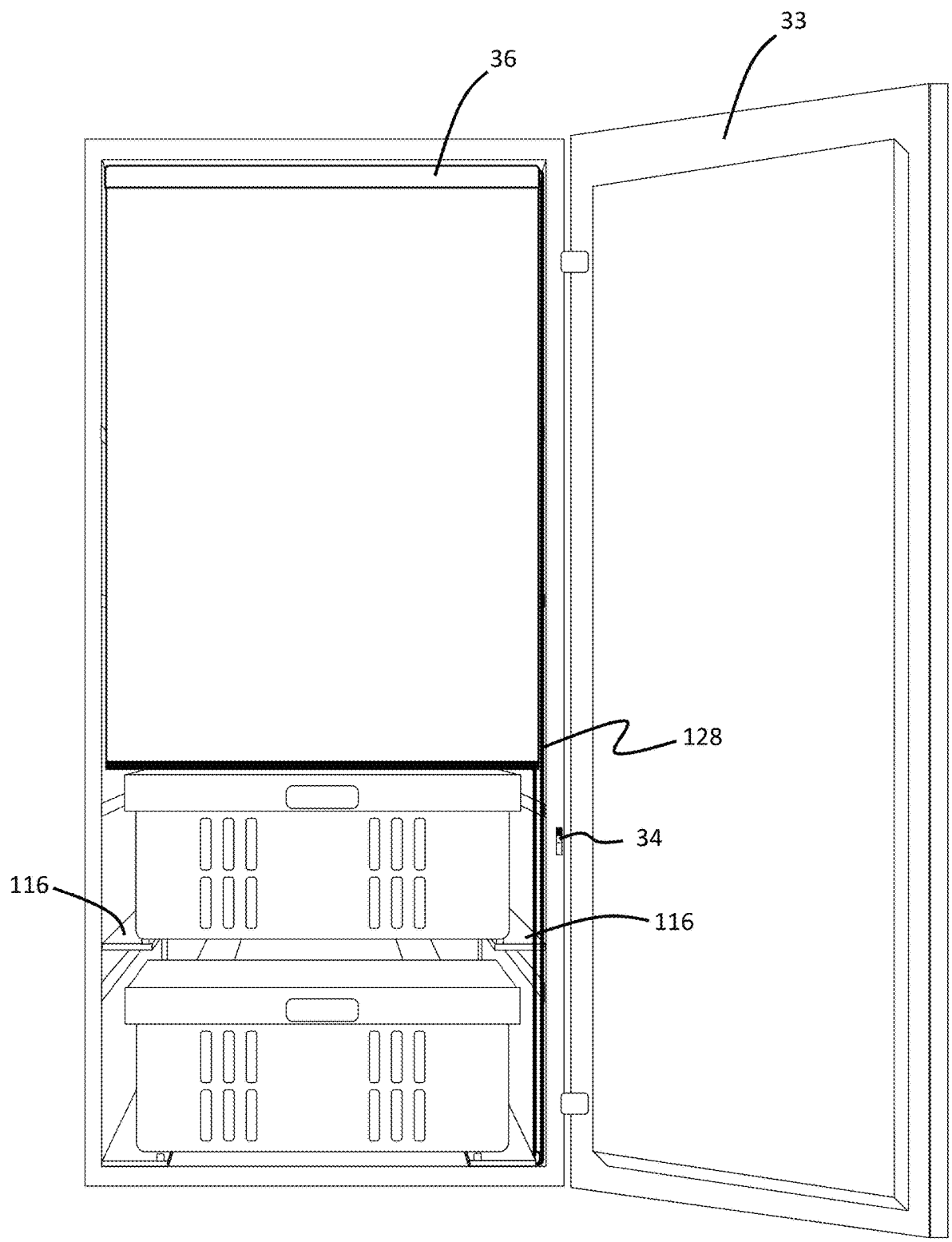
Figure 11:
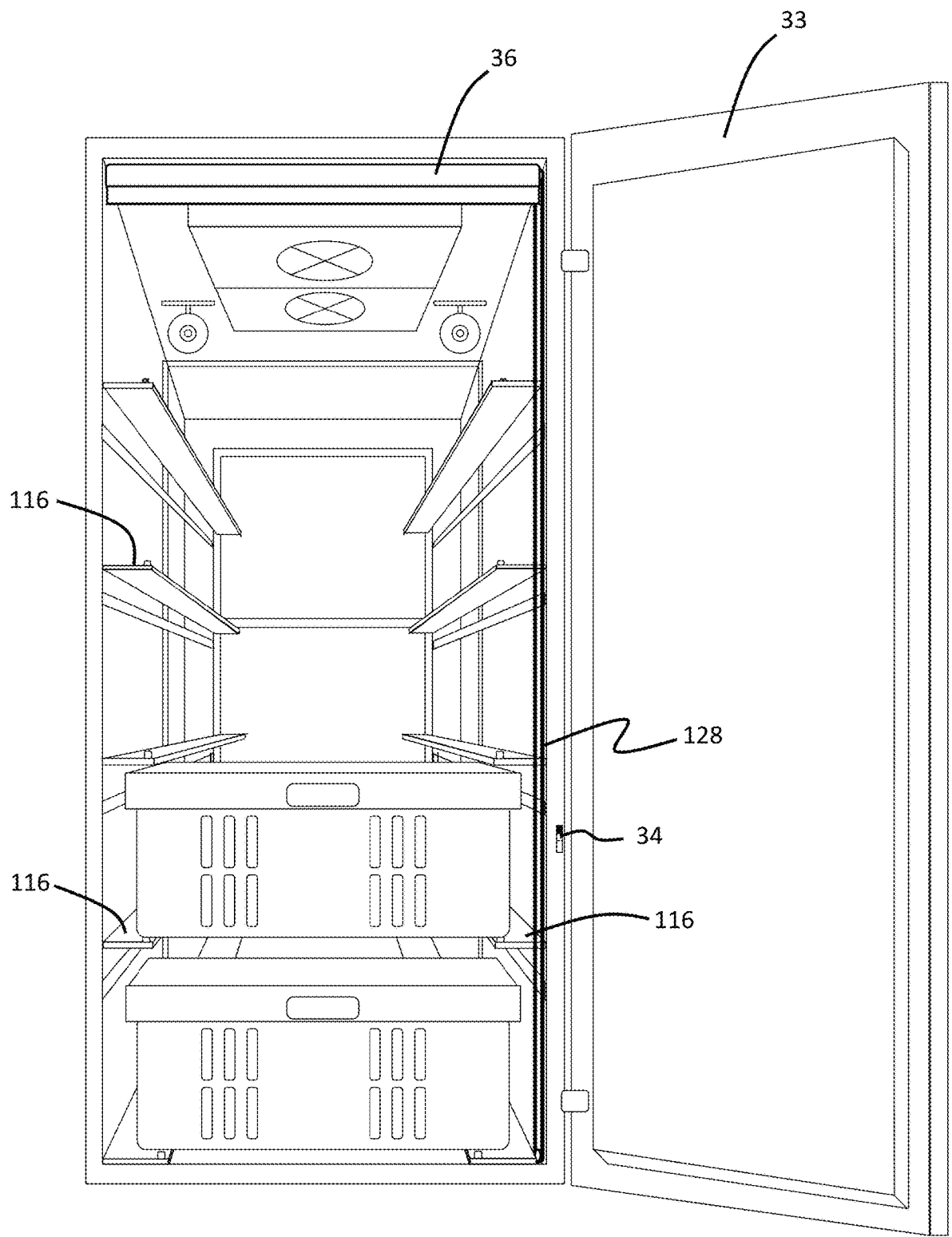

In yet another configuration, shown in FIGS. 9-11, the movable curtain may include a curtain roller or insulating curtain 36 disposed at a top of the opening of the temperature-controlled storage compartment 13. In addition, the vehicle may include a curtain roller switch 34 and an associated control circuit, such as control circuit 58. In one illustrative embodiment, the insulating curtain 36 is configured to be wound, at least partially, around the rod 37 when the electric switch is engaged thereby exposing a portion of the temperature-controlled storage compartment 13 to permit access thereto. FIG. 9 illustrates the insulating curtain 36 partially rolled upward permitting access to the bottommost slot of the temperature-controlled storage compartment 13. FIG. 10 illustrates the insulating curtain 36 being further rolled around the rod 37 at the top of the opening to the temperature-controlled storage compartment 13, thereby fully exposing the bottom three slots of the temperature-controlled storage compartment 13. To have access to each of the slots of the temperature-controlled storage compartment 13, the insulating curtain 36 may be nearly completely wrapped around the rod at the top of the opening to the temperature-controlled storage compartment 13, as shown in FIG. 11.

Figure 12:
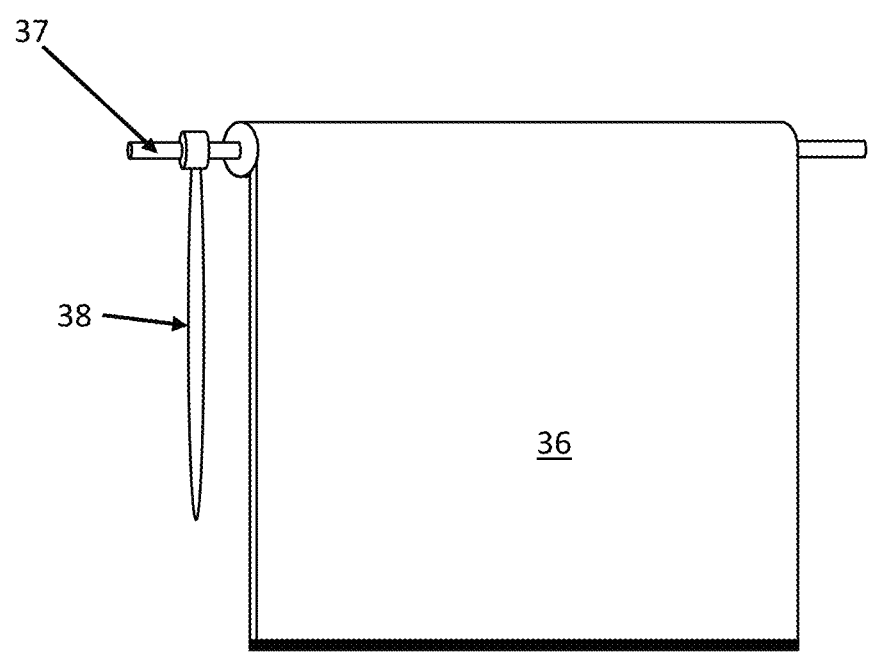
FIG. 12 is a partial perspective view of a roller curtain in accordance with some embodiments.

FIG. 12 illustrates the insulating curtain 36 rolled partially around the rod 37. While the insulating curtain 36 of FIGS. 9-11 was illustrated as movable via curtain roller switch 34, the insulating curtain 36 of FIG. 12 is movable via a pulley and chain 38. In this manner, the insulating curtain 36 is manually movable between the fully closed position covering substantially all of the opening of the temperature-controlled compartment to the fully open position exposing substantially all of the temperature-controlled compartment thereby permitting the delivery person to access all of the slots in the temperature-controlled storage compartment 13. Further, the pulley and chain 38 are configured to be pulled to thereby wind and unwind the insulating curtain 36 around the rod 37 thereby exposing or closing the opening to the temperature-controlled storage compartment 13.

Figure 13:
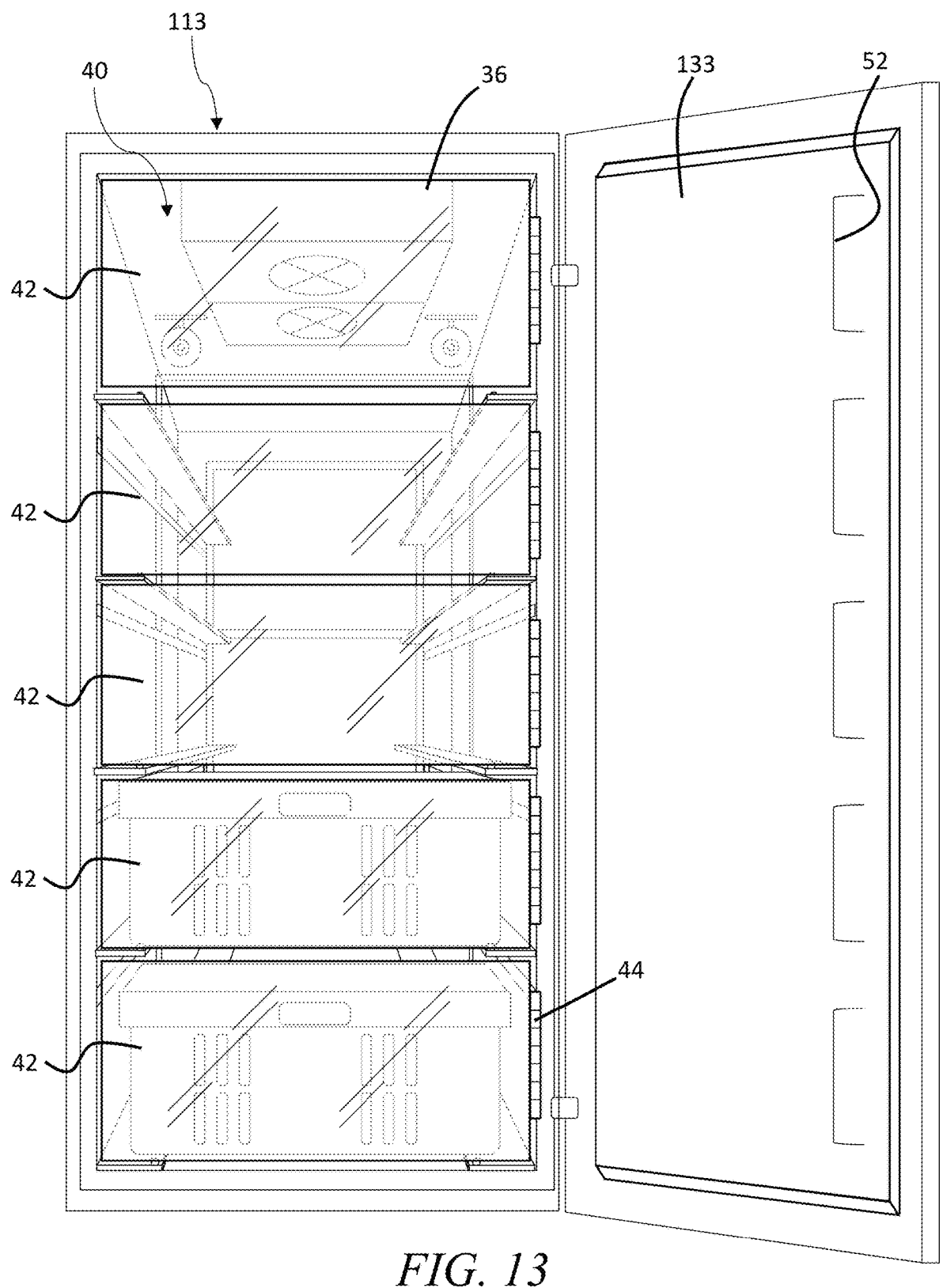
FIGS. 13 and 14 are side views of a temperature-controlled storage compartment in accordance with some embodiments.

FIG. 13 illustrates another device at the opening of a temperature-controlled storage compartment 113 to help retain the proper temperature of the temperature-controlled storage compartment 113. The insulating door panel 40 at the opening of a temperature-controlled storage compartment 113 may be disposed adjacent an inside wall of the insulating door 133. In one exemplary embodiment, the insulating door panel 40 is segmented such that it includes panel segments 42 that are movable to permit access to portions or slots of the temperature-controlled storage compartment 113 without moving the remainder of the insulating door panel from the opening of the temperature-controlled storage compartment 113. The panel segments 42 are independently movable such that a delivery person may move one or more of the panel segments 42 without moving the others. Similar to some of the previous discussed insulating barriers or panels, the panel segments 42 may be partly or completely transparent such that the delivery person can see inside the temperature-controlled compartments 113 through the insulating door panel 40 without moving the insulating door panel 40 or any portion thereof from the opening to the temperature-controlled storage compartment 113.

By one approach, the panel segments 42 of the insulating door panel 40 are hingedly attached to the delivery vehicle 10 such that the panel segments 42 can be easily moved out of the way by the delivery person. In one illustrative approach, the panel segments 42 be comprised of flexible material such that the panel segments 42 may be bent backward toward the insulating door 133 and/or may have a hinge 44 where the segmented panel 42 attaches to the delivery vehicle 10.

Figure 14:
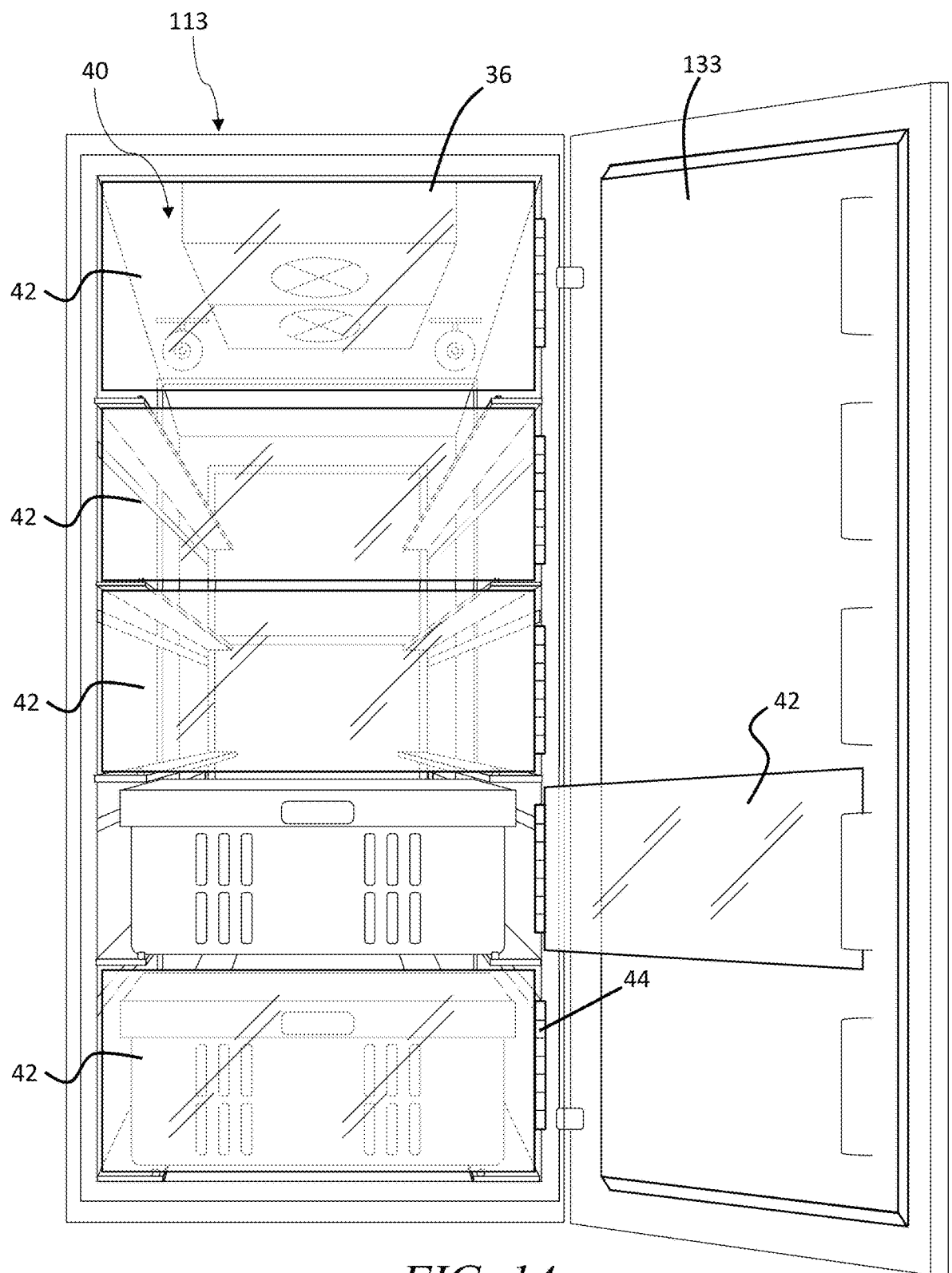

The insulating door 133 and/or the panel segments 42 may include a mechanism or a portion thereof such that the panel segments 42 may be positioned a distance away from the opening of the slot or temperature-controlled storage compartment 113 so that the delivery person may easily load and/or unload items or product containers 14 from the delivery vehicle 10. By one approach, the mechanism may permit the panel segment 42 to be disposed in a stable position away from the opening. In one illustrative embodiment, the insulating door 133 includes slots 52 into which an end of the panel segment 42 may be positioned to retain the panel segment 42 in an open position during loading and/or unloading of the slot of the temperature-controlled storage compartment 13. FIG. 14 illustrates one of the panel segments 42 (second from the bottom) being in the opened-position with an edge of the segment 42, opposite the end with the hinge 44, engaging a slot 52 in the insulating door 133. In this manner, the slot 52 retains the end of the panel segment 42 such that the panel segment 42 is retained in a position adjacent the insulating door 133.

Figure 15:
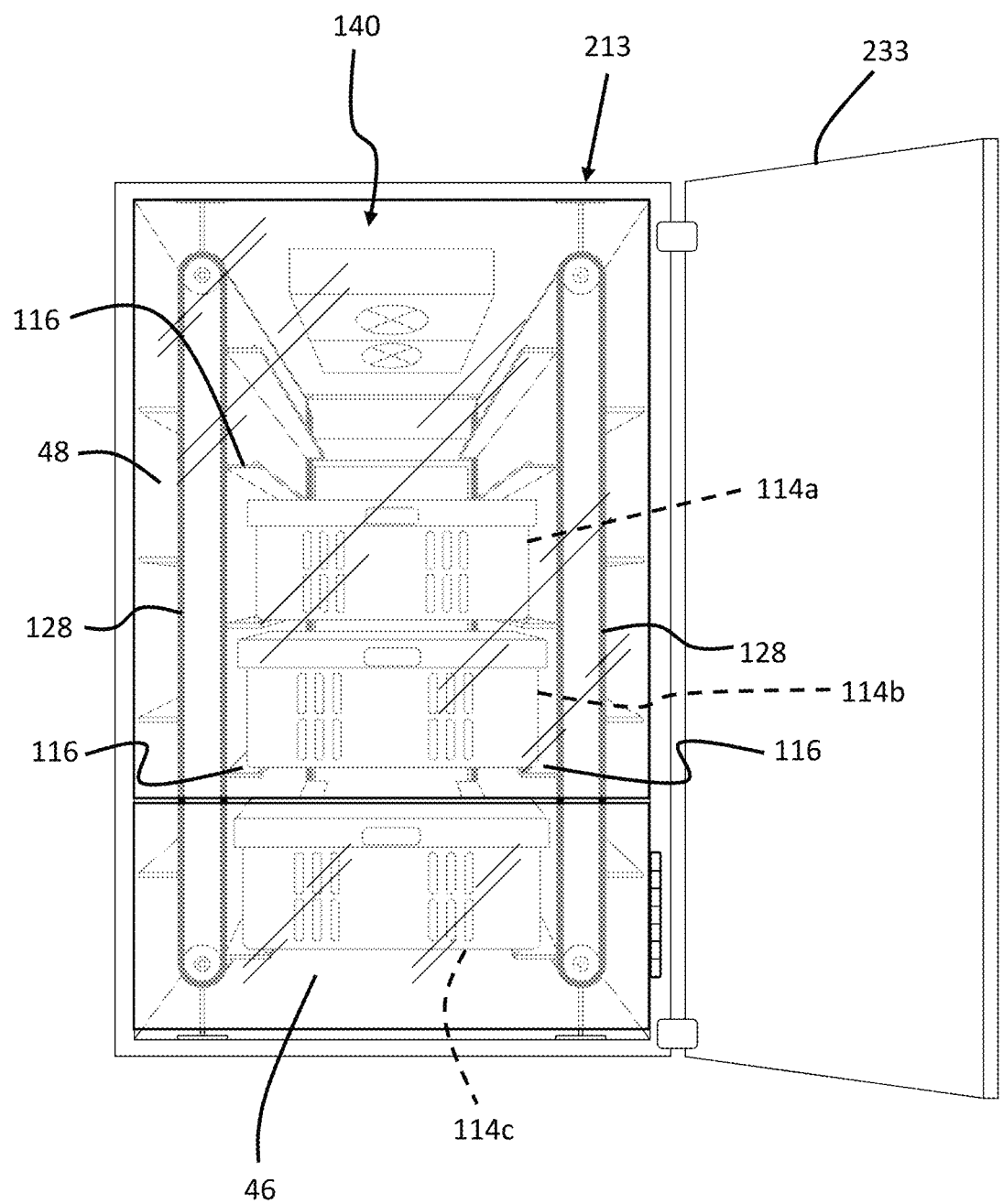
FIGS. 15 and 16 are side views of a temperature-controlled storage compartment in accordance with some embodiments.
Figure 16:
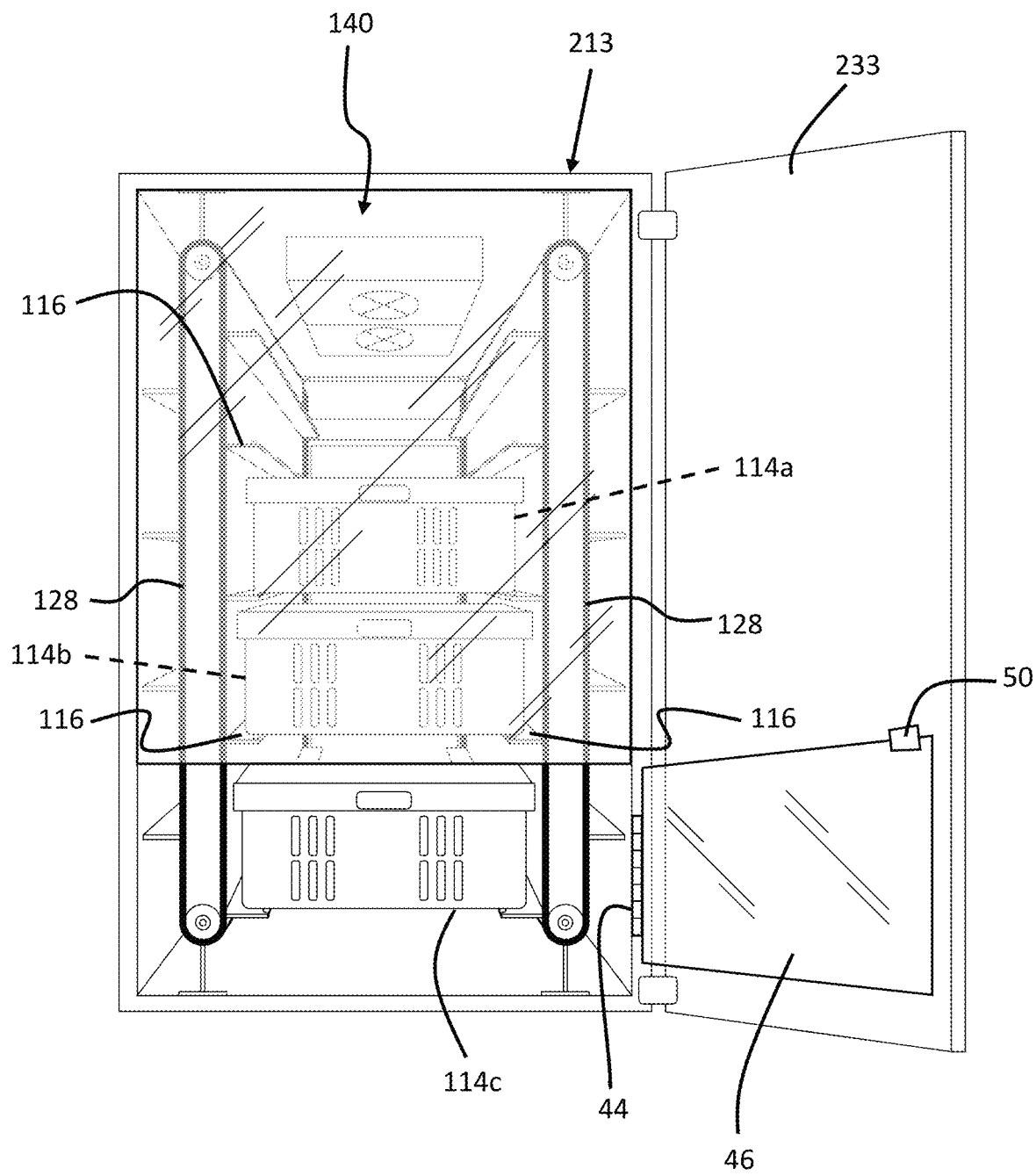

FIGS. 15 and 16 illustrate another device at the opening of the temperature-controlled storage compartment 213 to help retain the temperature thereof. The insulating door panel 140, in this configuration, includes a stationary or non-movable panel portion 48 and a movable panel portion 46. In the example embodiment of FIGS. 15 and 16, the movable panel portion 46 is disposed at the lowermost slot of the temperature-controlled storage compartment 213, but the movable panel portion 46 may be disposed at any of the slots along the height of the temperature-controlled compartment 213.

To permit the delivery person to access the product containers 114 and/or slots disposed behind the non-movable portion 48 of the insulating door panel 140, the delivery vehicle 10 may include a conveyor mechanism such as a first and second conveyor chains 128, similar to those discussed above, configured to move the product containers 114 within the temperature-controlled storage compartment 213. In this manner, the first and second conveyor chains 128 are configured to move the horizontally mounted first and second support rails 116 securely attached thereto and the product containers 114 engaging the support rails 116. In this manner, the delivery person is able to load a first product container 114a into the lower slot of the temperature-controlled storage compartment 213, and then move that product container 114a upward from the lowermost opening of the temperature-controlled storage compartment 213 such that another product container 114b or 114c can be loaded into the temperature-controlled storage compartment 213 below the previously loaded product container 114a. Furthermore, to unload the compartment 213, the first and second conveyor chains 128 may be moved such that the upper product containers are moved to the lowermost position adjacent the movable portion 46 of the insulating door panel 140.

In one configuration, illustrated in FIGS. 15 and 16, the movable portion 46 of the insulating door panel 140 is disposed adjacent the lowermost position of the product containers and the non-movable portion 48 is disposed adjacent the remaining positions of the product containers such that the movable portion 46 of the insulating door panel 140 permits the product containers to be loaded into and out of the temperature-controlled storage compartment 213 and the first and second conveyor chains 128 permit the horizontally-mounted first and second support rails 116 to move and the product containers supported thereby to be moved between positions in the temperature-controlled storage compartment 213.

To unload the temperature-controlled storage compartment 213, the delivery person exposes the opening to the temperature-controlled storage compartment 113 by moving the movable portion 46 toward the insulating door 233. Similar to insulating panels previously discussed, the insulating door panel 140 may be at least partially transparent and the movable portion 46 also may be flexible and/or may include a hinge facilitating movement of the movable portion 46.

The movable portion 46 of the insulating door panel 140 and/or the insulating door 233 also may include a mechanism or portion thereof such that the movable portion 46 may be stably positioned a distance away, from the opening of the slot or the temperature-controlled storage compartment 213 so that the delivery person may easily load and/or unload items or product containers 14, 114 from the delivery vehicle 10. The movable portion 46 attachment mechanism or door clip 50 that permits the movable portion 46 to be stably positioned away or outward from the opening of the temperature-controlled storage compartment 213 may have a number of different configurations, such as, for example, a clip, clasp, hook, or other fastener. In this manner, the movable portion 46 may be secured in an open position for loading and/or unloading of the temperature-controlled storage compartment 213.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A delivery vehicle comprising:
a vehicle body;
storage compartments disposed within the vehicle body, the storage compartments configured to receive a plurality of product containers;
a plurality of horizontally-mounted first and second support rails in each of the storage compartments, the first and second support rails mounted on opposite sides of the storage compartments and configured to support and receive a portion of the product containers thereon, the plurality of horizontally-mounted first and second support rails permitting multiple product containers to be stored atop one another with each of the product containers having the first support rail disposed along a first side thereof and the second support rail disposed along a second, opposite side thereof;
retractable retaining elements disposed adjacent ends of the first and second support rails proximate storage compartment openings, the retractable retaining elements having a first position and a second position, the retractable retaining elements configured to securely retain the product containers within the storage compartments during transit in the first position and the second position permitting quick loading of the storage compartments;
first and second conveyor chains disposed on opposite sides of the storage compartments, the first and second conveyor chains configured to vertically move the horizontally-mounted first and second support rails that are securely attached to the first and second conveyor chains to move the product containers supported thereon;
a temperature-controlled compartment configured to receive a plurality of product containers within the temperature-controlled compartment;
a door providing access to the temperature-controlled compartment; and
an insulating door panel or a movable curtain disposed at a temperature-controlled compartment opening, the insulating door panel or the movable curtain configured to retain air in the temperature-controlled compartment.

2. The delivery vehicle of claim 1 wherein the retractable retaining elements comprise a system of hydraulic knobs.

3. The delivery vehicle of claim 2 wherein the system of hydraulic knobs are at least one of individually retractable or systemically retractable.

4. The delivery vehicle of claim 3 wherein the system of hydraulic knobs further comprises an engagement switch configured to position the hydraulic knobs into the first position configured to securely retain each of the product containers within an associated slot in the storage compartments.

5. The delivery vehicle of claim 1 wherein the retractable retaining elements comprise spring-loaded knobs.

6. The delivery vehicle of claim 1 wherein the movable curtain is configured to retain air in the temperature-controlled compartment and further comprising a rod disposed at a top of the temperature-controlled compartment opening and the movable curtain configured to be wound around the rod to expose a portion of the temperature-controlled compartment to permit access thereto.

7. The delivery vehicle of claim 6 wherein the movable curtain is insulated to help retain chilled air in the temperature-controlled compartment.

8. The delivery vehicle of claim 7 further comprising an electric switch wherein the insulated movable curtain is configured to be wound, at least partially, around the rod when the electric switch is engaged thereby exposing a portion of the temperature-controlled compartment opening to permit access thereto.

9. The delivery vehicle of claim 7 further comprising a pulley and a chain configured to be pulled to thereby wind the insulated movable curtain around the rod associated with the pulley and the chain thereby exposing a portion of the temperature-controlled compartment opening to permit access thereto.

10. The delivery vehicle of claim 1 wherein the insulating door panel is disposed adjacent an inside wall of the door.

11. The delivery vehicle of claim 10 wherein the insulating door panel is segmented such that segments of the insulating door panel are movable to permit access to the temperature-controlled compartment without moving the remainder of the insulating door panel from the temperature-controlled compartment opening.

12. The delivery vehicle of claim 11 wherein the insulating door panel comprises a movable panel portion and a non-movable panel portion.

13. The delivery vehicle of claim 12 wherein the first and second conveyor chains and the product containers supported thereon are movable such that an uppermost product container may be moved to a lowermost position.

14. A delivery vehicle comprising:
  storage compartments configured to receive a plurality of product containers;
  a plurality of horizontally-mounted first and second support rails in each of the storage compartments, the first and second support rails mounted on opposite sides of the storage compartments and configured to support and receive a portion of the product containers thereon, the plurality of horizontally-mounted first and second support rails permitting multiple product containers to be stored atop one another with each of the product containers having the first support rail disposed along a first side thereof and the second support rail disposed along a second, opposite side thereof;
  first and second conveyor chains disposed on opposite sides of the storage compartments, the first and second conveyor chains configured to vertically move the horizontally-mounted first and second support rails that are securely attached to the first and second conveyor chains to move the product containers supported thereon;
  a temperature-controlled compartment configured to receive a plurality of product containers within the temperature-controlled compartment;
  a door providing access to the temperature-controlled compartment;
  an insulating door panel or a movable curtain disposed at a temperature-controlled compartment opening, the insulating door panel or the movable curtain configured to retain air in the temperature-controlled compartment; and
  retractable retaining elements disposed adjacent ends of the first and second support rails proximate storage compartment openings, the retractable retaining elements having a first position and a second position, the retractable retaining elements configured to securely retain the product containers within the storage compartments during transit in the first position and the second position permitting quick loading of the storage compartments, the retractable retaining element being spring-loaded knobs; and
  a first plate or an inner shaft onto which the spring-loaded knobs are mounted and a second plate or an outer sleeve with openings therein through which the spring-loaded knobs are configured to extend when the spring-loaded knobs are disposed in the first position to thereby retain the product containers in position in the storage compartments.

15. The delivery vehicle of claim 14 wherein the first plate or inner shaft and the second plate or outer sleeve are slidable relative to one another such that the spring-loaded knobs are moved to the second position when the second plate or the outer sleeve is disposed over the spring-loaded knobs and the spring-loaded knobs are moved to the first portion when the second plate or the outer sleeve is moved such that the spring-loaded knobs extend through the openings in the second plate or the outer sleeve.

16. The delivery vehicle of claim 14 wherein the movable curtain is configured to retain air in the temperature-controlled compartment and further comprising a rod disposed at a top of the temperature-controlled compartment opening and the movable curtain configured to be wound around the rod to expose a portion of the temperature-controlled compartment to permit access thereto and the movable curtain is insulated to help retain chilled air in the temperature-controlled compartment.

17. The delivery vehicle of claim 16 further comprising an electric switch wherein the insulated movable curtain is configured to be wound, at least partially, around the rod when the electric switch is engaged thereby exposing a portion of the temperature-controlled compartment opening to permit access thereto.

18. The delivery vehicle of claim 17 further comprising a pulley and a chain configured to be pulled to thereby wind the insulated movable curtain around the rod associated with the pulley and the chain thereby exposing a portion of the temperature-controlled compartment opening to permit access thereto.

19. The delivery vehicle of claim 14 wherein the insulating door panel is disposed adjacent an inside wall of the door.

20. The delivery vehicle of claim 19 wherein the insulating door panel is segmented such that segments of the insulating door panel are movable to permit access to the temperature-controlled compartment without moving the remainder of the insulating door panel from the temperature-controlled compartment opening.

21. The delivery vehicle of claim 20 wherein the insulating door panel comprises a movable panel portion and a non-movable panel portion.

22. The delivery vehicle of claim 21 wherein the first and second conveyor chains and the product containers supported thereon are movable such that an uppermost product container may be moved to a lowermost position.

23. A delivery vehicle comprising:
  storage compartments configured to receive a plurality of product containers;
  a plurality of horizontally-mounted first and second support rails in each of the storage compartments, the first and second support rails mounted on opposite sides of the storage compartments and configured to support and receive a portion of the product containers thereon, the plurality of horizontally-mounted first and second support rails permitting multiple product containers to be stored atop one another with each of the product containers having the first support rail disposed along a first side thereof and the second support rail disposed along a second, opposite side thereof;
  retractable retaining elements disposed adjacent ends of the first and second support rails proximate storage compartment openings, the retractable retaining elements having a first position and a second position, the retractable retaining elements configured to securely retain the product containers within the storage compartments during transit in the first position and the second position permitting quick loading of the storage compartments;
  first and second conveyor chains disposed on opposite sides of the storage compartments, the first and second conveyor chains configured to vertically move the horizontally-mounted first and second support rails that are securely attached to the first and second conveyor chains to move the product containers supported thereon;

a temperature-controlled compartment configured to receive a plurality of product containers within the temperature-controlled compartment;
a door providing access to the temperature-controlled compartment; and
an insulating door panel disposed at a temperature-controlled compartment opening, the insulating door panel configured to retain air in the temperature-controlled compartment and being disposed adjacent an inside wall of the door, the insulating door panel being segmented such that at least one segment of the insulating door panel is movable to permit access to the temperature-controlled compartment without moving the remainder of the insulating door panel from the temperature-controlled compartment opening such that the insulating door panel comprises a movable panel portion and a non-movable panel portion;
wherein the first and second conveyor chains and the product containers supported thereon are movable such that an uppermost product container may be moved to a lowermost position and wherein the movable portion of the insulating door panel is disposed adjacent the lowermost position of the product containers and the non-movable panel portion is disposed adjacent remaining positions of the product containers such that the movable portion of the insulating door panel permits the product containers to be loaded into and out of the temperature-controlled compartment and the first and second conveyor chains permit the horizontally-mounted first and second support rails and the product containers supported thereby to be moved between positions in the temperature-controlled compartment.

24. The delivery vehicle of claim 23 further comprising a retaining mechanism configured to retain the insulating door panel or segments thereof in an open position during loading and unloading of the temperature-controlled compartment.

25. The delivery vehicle of claim 23 wherein the retractable retaining elements comprise a system of hydraulic knobs that are at least one individually retractable or systemically retractable.

26. The delivery vehicle of claim 25 wherein the system of hydraulic knobs further comprises an engagement switch configured to position the hydraulic knobs into the first position configured to securely retain each of the product containers within an associated slot in the storage compartments.

27. The delivery vehicle of claim 23 wherein the retractable retaining elements comprise spring-loaded knobs.

28. The delivery vehicle of claim 27 further comprising a first plate or an inner shaft onto which the spring-loaded knobs are mounted and a second plate or an outer sleeve with openings therein through which the spring-loaded knobs are configured to extend when the spring-loaded knobs are disposed in the first position to thereby retain the product containers in position in the storage compartments.

29. A delivery vehicle comprising:
storage compartments configured to receive a plurality of product containers;
a plurality of horizontally-mounted first and second support rails in each of the storage compartments, the first and second support rails mounted on opposite sides of the storage compartments and configured to support and receive a portion of the product containers thereon, the plurality of horizontally-mounted first and second support rails permitting multiple product containers to be stored atop one another with each of the product containers having the first support rail disposed along a first side thereof and the second support rail disposed along a second, opposite side thereof;
first and second conveyor chains disposed on opposite sides of the storage compartments, the first and second conveyor chains configured to vertically move the horizontally-mounted first and second support rails that are securely attached to the first and second conveyor chains to move the product containers supported thereon;
a temperature-controlled compartment configured to receive a plurality of product containers within the temperature-controlled compartment;
a door providing access to the temperature-controlled compartment;
an insulating door panel or a movable curtain disposed at a temperature-controlled compartment opening, the insulating door panel or the movable curtain configured to retain air in the temperature-controlled compartment; and
retractable retaining elements disposed adjacent ends of the first and second support rails proximate storage compartment openings, the retractable retaining elements having a first position and a second position, the retractable retaining elements configured to securely retain the product containers within the storage compartments during transit in the first position and the second position permitting quick loading of the storage compartments, wherein the retractable retaining elements are disposed on the first and second support rails that are movable via the first and second conveyor chains such that the retractable retaining elements move therewith.

30. The delivery vehicle of claim 29 wherein the retractable retaining elements comprise a system of hydraulic knobs that are at least one individually retractable or systemically retractable.

31. The delivery vehicle of claim 29 wherein the system of hydraulic knobs further comprises an engagement switch configured to position the hydraulic knobs into the first position configured to securely retain each of the product containers within an associated slot in the storage compartments.

32. The delivery vehicle of claim 29 wherein the retractable retaining elements comprise spring-loaded knobs.

33. The delivery vehicle of claim 32 further comprising a first plate or an inner shaft onto which the spring-loaded knobs are mounted and a second plate or an outer sleeve with openings therein through which the spring-loaded knobs are configured to extend when the spring-loaded knobs are disposed in the first position to thereby retain the product containers in position in the storage compartments.

34. The delivery vehicle of claim 29 wherein the movable curtain is insulated to help retain chilled air in the temperature-controlled compartment and further configured to retain air in the temperature-controlled compartment and further comprising a rod disposed at a top of the temperature-controlled compartment opening and the movable curtain configured to be wound around the rod to expose a portion of the temperature-controlled compartment to permit access thereto.

35. The delivery vehicle of claim 29 further comprising an electric switch wherein the insulated movable curtain is configured to be wound, at least partially, around the rod when the electric switch is engaged thereby exposing a portion of the temperature-controlled compartment opening to permit access thereto.

* * * * *